(12) United States Patent
McCormick et al.

(10) Patent No.: US 8,863,024 B2
(45) Date of Patent: *Oct. 14, 2014

(54) SMART WINDOW CREATION IN A GRAPHICAL USER INTERFACE

(71) Applicant: International Business Machines Corporation, Armonk, NY (US)

(72) Inventors: Timothy McCormick, Winchester (GB); Alexander Mitchell, East Dulwich (GB); Adam J. Pilkington, Winchester (GB); Stuart P. Wilkinson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,984

(22) Filed: Mar. 7, 2013

(65) Prior Publication Data

US 2013/0185672 A1   Jul. 18, 2013

Related U.S. Application Data

(63) Continuation of application No. 13/657,917, filed on Oct. 23, 2012.

(30) Foreign Application Priority Data

Nov. 3, 2011 (GB) .................................. 1118991.7

(51) Int. Cl.
*G06F 3/048* (2013.01)
*G06F 3/0481* (2013.01)

(52) U.S. Cl.
CPC .......... *G06F 3/0481* (2013.01); *G06F 3/04812* (2013.01)

USPC .......................................................... 715/788

(58) Field of Classification Search
None
See application file for complete search history.

(56) References Cited

U.S. PATENT DOCUMENTS

| 5,119,494 A * | 6/1992 | Garman ........................ 711/202 |
| 5,371,847 A | 12/1994 | Hargrove |
| 5,796,403 A | 8/1998 | Adams |
| 6,281,879 B1 * | 8/2001 | Graham ........................ 345/157 |
| 7,373,592 B2 * | 5/2008 | Allyn ............................ 715/211 |

(Continued)

FOREIGN PATENT DOCUMENTS

| EP | 1158391 | 11/2001 |
| WO | 2007023230 | 3/2007 |

OTHER PUBLICATIONS

Arthur Naiman, The Macintosh Bible, 1988-1989, Goldstein and Blair, second edition, pp. 37, 115-127, 658, 694, 696.*

(Continued)

*Primary Examiner* — Matt Kim
*Assistant Examiner* — Mary Dixon
(74) *Attorney, Agent, or Firm* — Yee & Associates, P.C.; William Stock

(57) ABSTRACT

A method for controlling a graphical user interface (GUI) comprises preparing a window for displaying at an intended display location in a window display operation. The location of GUI control elements of the window at the intended display location and the location of a graphical cursor are identified. GUI control element location and the graphical cursor location are compared. The window display operation is modified if the two coincide, for example by moving the window display location so that they do not coincide.

7 Claims, 4 Drawing Sheets

(56) References Cited

U.S. PATENT DOCUMENTS

| | | |
|---|---|---|
| 7,818,691 B2 | 10/2010 | Irvine |
| 8,015,509 B2 | 9/2011 | Karstens |
| 2002/0059288 A1* | 5/2002 | Yagi et al. ............... 707/102 |
| 2005/0088410 A1* | 4/2005 | Chaudhri ................ 345/157 |
| 2006/0010397 A1* | 1/2006 | Laffey .................... 715/808 |
| 2006/0161871 A1* | 7/2006 | Hotelling et al. ......... 715/863 |
| 2009/0113330 A1* | 4/2009 | Garrison et al. .......... 715/769 |
| 2009/0193357 A1 | 7/2009 | Panico |
| 2010/0085317 A1 | 4/2010 | Park |
| 2010/0088634 A1* | 4/2010 | Tsuruta et al. ............ 715/800 |
| 2011/0205186 A1* | 8/2011 | Newton et al. ........... 345/175 |
| 2013/0117709 A1 | 5/2013 | McCormick et al. |

OTHER PUBLICATIONS

McCormick et al., "Smart Window Creation in a Graphical User Interface," U.S. Appl. No. 13/657,917, filed Oct. 23, 2012, 19 pages.

Office Action, dated Jan. 31, 2014, regarding U.S. Appl. No. 13/657,917, 24 pages.

Notice of Allowance, dated Jun. 6, 2014, regarding U.S. Appl. No. 13/657,917, 12 pages.

* cited by examiner

SMART WINDOW CREATION IN A GRAPHICAL USER INTERFACE

CROSS-REFERENCE TO RELATED APPLICATION(S)

This application is a Continuation of and claims the benefit of priority to U.S. patent application Ser. No. 13/657,917, filed on Oct. 23, 2012 and entitled "Smart Window Creation in a Graphical User Interface", which claims priority to GB Application No. 1118991.7 filed on Nov. 3, 2011, the contents of which are hereby incorporated by reference.

FIELD OF THE INVENTION

The present invention relates to graphical user interfaces. More particularly, it relates to improvements to window creation in graphical user interfaces.

BACKGROUND TO THE INVENTION

Since the nineteen eighties, the predominant means of human-computer interaction has been via a graphical user interface (GUI). The dominant form of GUI has been known by the acronym WIMP after its main elements: window; icon; menu; and pointing device. In this form of interaction, the computer operating system provides a display representing a desktop metaphor with icons representing links to objects such as directories and applications. On selection by a user of an appropriate icon, the operating system may create an instance of an application which runs within a window, a metaphorical "view" of the running application which functions as a self-contained entity on the desktop of the GUI display. The user interacts with the GUI using a pointing device, such as a mouse or a joystick, to control the movement of a cursor which specifies the point of interaction with the GUI display. Using, for example, a mouse, the user may position the cursor over graphical controls such as icons, menu entries, and window control regions, and then operate a mouse button to send an operation command to the control, which then causes an operation specified by the control to be performed. In an example of a user interface provided by Microsoft Windows (Windows is a registered trade mark of Microsoft Corporation) the window has three control buttons at the top right of the window which, respectively, cause the following functions to be performed: minimizing the window to, for example, a selectable icon on the toolbar of a GUI display; maximizing the window to cover the full screen of the display; and closing the window to close that instance of an application.

A user may have many windows and minimized windows displayed at a time, and may be opening and closing new windows over time. In such an environment, windows may be created or restored from a minimized condition at any time. It is therefore possible for windows to be created or restored to a position on the display so that a window control button is under the current position of the cursor. If at the same time a user operates a mouse button, for example, this will cause the unintended operation of the window control button function, such as to minimize, maximize or close the corresponding window.

United States published patent application U.S. 2009/0193357 discloses a method to prevent a second application GUI interface window blocking a first application GUI interface window while the user's focus is on the first window causing unintended input into the second application window. This is accomplished by temporarily discarding inputs while the graphical cursor is located on the second application window for a predetermined amount of time to give the user enough time to refocus on the second application window.

United States published patent application U.S.2009/0125850 discloses the addition of a user selectable lock to a GUI control, such as a close button. The lock can be imposed on an individual window. After being applied, a user will have to explicitly unlock the control before the control can be selected, which prevents inadvertent selections of the locked control. For example, a lock can be placed on a close control to prevent accidental closing of a window. Locks can be manually or automatically applied. Automatically applied locks can be associated with a set of user configurable rules, which can also establish rules for automatically unlocking GUI controls. An applied GUI control lock can be unlocked in a user configurable manner, with any level of security.

It would be advantageous to provide a better solution to the problem of the inadvertent selection of GUI window control buttons which may occur when a window is displayed on a display screen and the position of a window control button coincides with the graphical cursor position.

SUMMARY OF THE INVENTION

Accordingly, viewed from a first aspect the present invention provides a method for controlling a graphical user interface, GUI, comprising preparing a window for displaying at an intended display location in a window display operation, identifying a location of a GUI control element of the window at the intended display location, identifying a location of a graphical cursor, and comparing the GUI control element location with the graphical cursor location. On identifying that the locations coincide, the window display operation is modified.

Preferably the method provides for the GUI control element to be one of: a close button; a minimize button; a maximize button; a menu button; a check box or a radio button.

Preferably the method provides for modifying the window display operation comprising changing the intended display location of the window so that the GUI control element location and graphical cursor location do not coincide.

Preferably the method provides for the location of the graphical cursor being a current location.

Preferably the method provides for the location of the graphical cursor being a predicted location.

Preferably the method provides for the predicted location being determined from cursor movement speed and direction information.

Preferably the method provides for modifying the window display operation comprising disabling the operation of the GUI control element.

Preferably the method provides for repeating the comparison after a time interval, and if the locations do not coincide, displaying the window with GUI control element operation enabled.

According to a second aspect of the present invention, there is provided a computer system for effecting the controlling of a graphical user interface, GUI, comprising a processor, and a display device in communication with the processor. A window display component is for preparing a window for displaying at an intended display location in a window display operation. A first identifying component is for identifying the location of a GUI control element of the window at the intended display location. A second identifying component is for identifying a location of a graphical cursor. A comparison component is for comparing the GUI control element location with the graphical cursor location. A third identifying component is for identifying that the locations coincide and a modifier component is for modifying the window display operation.

Preferably the system provides for the GUI control element being one of: a close button; a minimize button; a maximize button; a menu button; a check box or a radio button.

Preferably the system provides for the modifier component being for modifying the window display operation by changing the window display location so that the GUI control element location and graphical cursor location do not coincide.

Preferably the system provides for the location of the graphical cursor being a current location.

Preferably the system provides for the location of the graphical cursor being a predicted location.

Preferably the system provides for the predicted location being determined from information concerning speed and direction of cursor movement.

Preferably the system provides for the modifier component being for modifying the window display operation by disabling the operation of the GUI control element.

Preferably the system provides for the comparison component repeating the comparison after a time interval, and if the locations do not coincide, the window display component displaying the window with GUI control element operation enabled.

According to a third aspect of the present invention, there is provided a computer program comprising computer program code stored on a computer readable medium to, when loaded into a computer system and executed thereon, cause the computer system to perform the steps of the method according to the first aspect.

BRIEF DESCRIPTION OF THE DRAWINGS

A preferred embodiment of the present invention is described below, by way of example only, with reference to the following drawings, in which.

DETAILED DESCRIPTION OF THE INVENTION

Figure 1A:
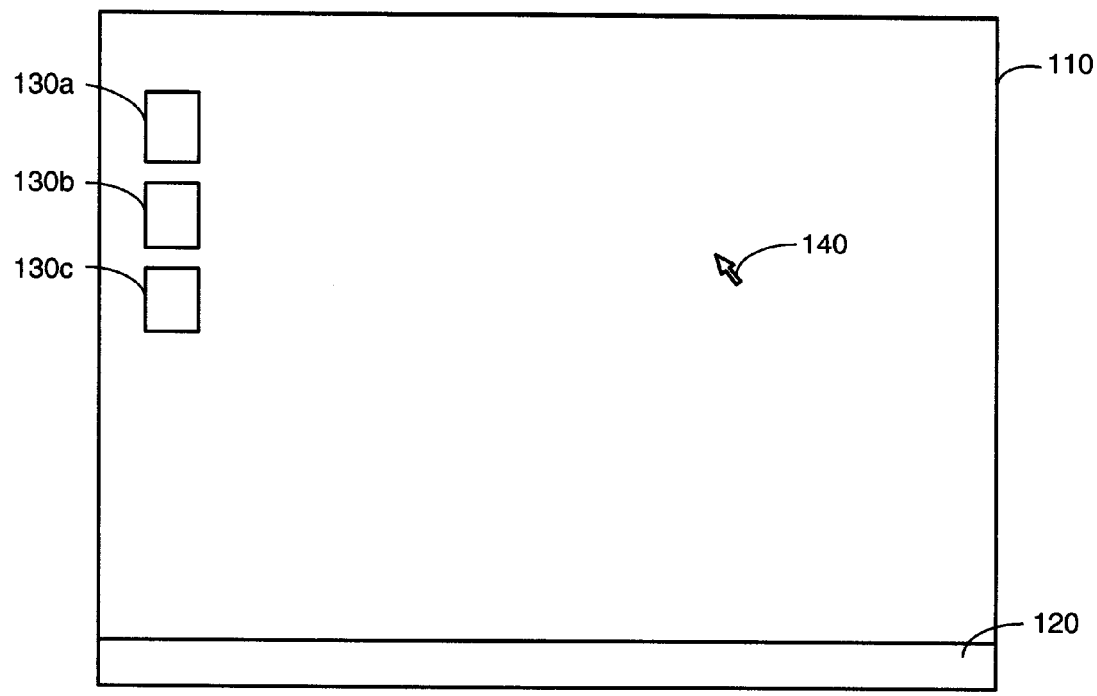
FIG. 1a is a representation of a desktop of a graphical user interface of a preferred embodiment of the present invention.

Referring to the figures, FIG. 1a is a representation of a graphical user interface of a preferred embodiment of the present invention. The graphical user interface comprises desktop 110, on which are displayed taskbar 120 and icons 130a, 130b and 130c. Icons 130a, 130b and 130c represent selectable software items, for example applications or data folders. An iconic representation of an application appears on the taskbar when an instance of the application is opened in a window. Graphical cursor 140 is freely moveable on desktop 110 using a cursor movement device such as a computer mouse, a trackball, a trackpad or a joystick. It is understood that other arrangements of graphical user interface are possible without departing from the invention.

Figure 1B:
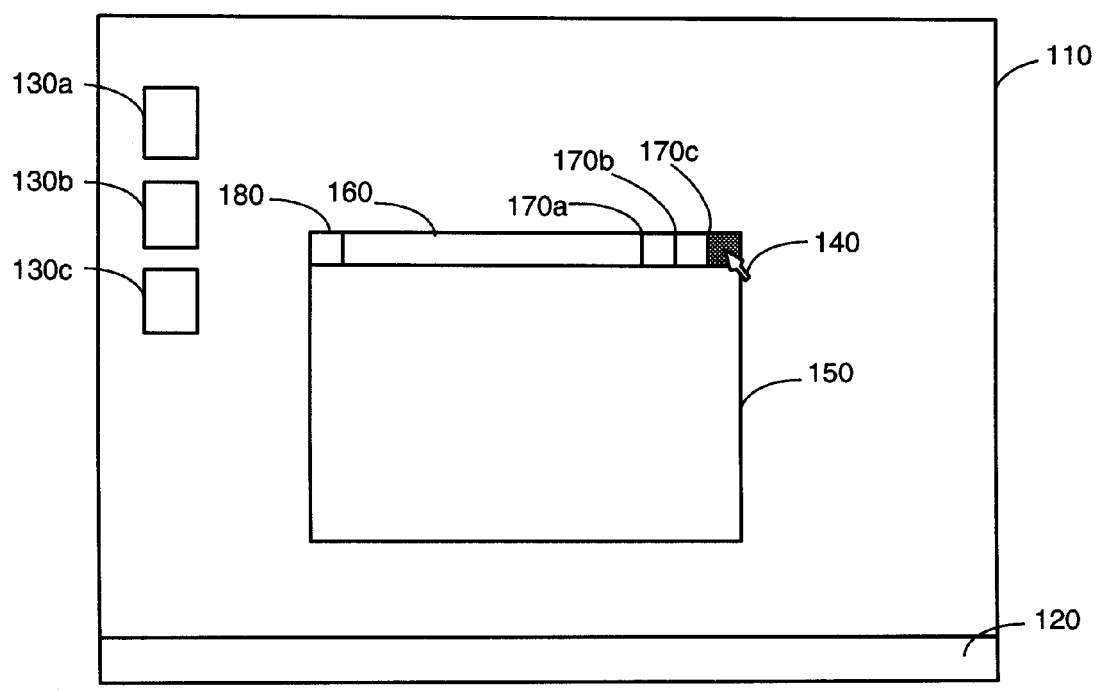
FIG. 1b is a representation of a desktop of a graphical user interface of a preferred embodiment of the present invention after opening of a window.

FIG. 1b illustrates the opening of a window on the graphical user interface of FIG. 1. A user starts an instance of an application in a window 150 on desktop 110. This initiation action may follow selection of an icon representing the application by using a cursor 140 under the control of a cursor control device, for example a mouse, trackball, trackpad, or joystick. It may also be accomplished by selection from a menu of selectable items. Window 150 comprises, in addition to the window contents, title bar 160. At the left of title bar 160 is window menu selection button 180. Selection of this button causes display of a drop down menu of available selection operations. At the right of title bar 160 are, respectively, MINIMIZE button 170a, MAXIMIZE button 170b and CLOSE button 170c. The selection of these buttons causes, respectively, the minimization of window 150, the maximization of the window, and the closure of the window.

Figure 2:
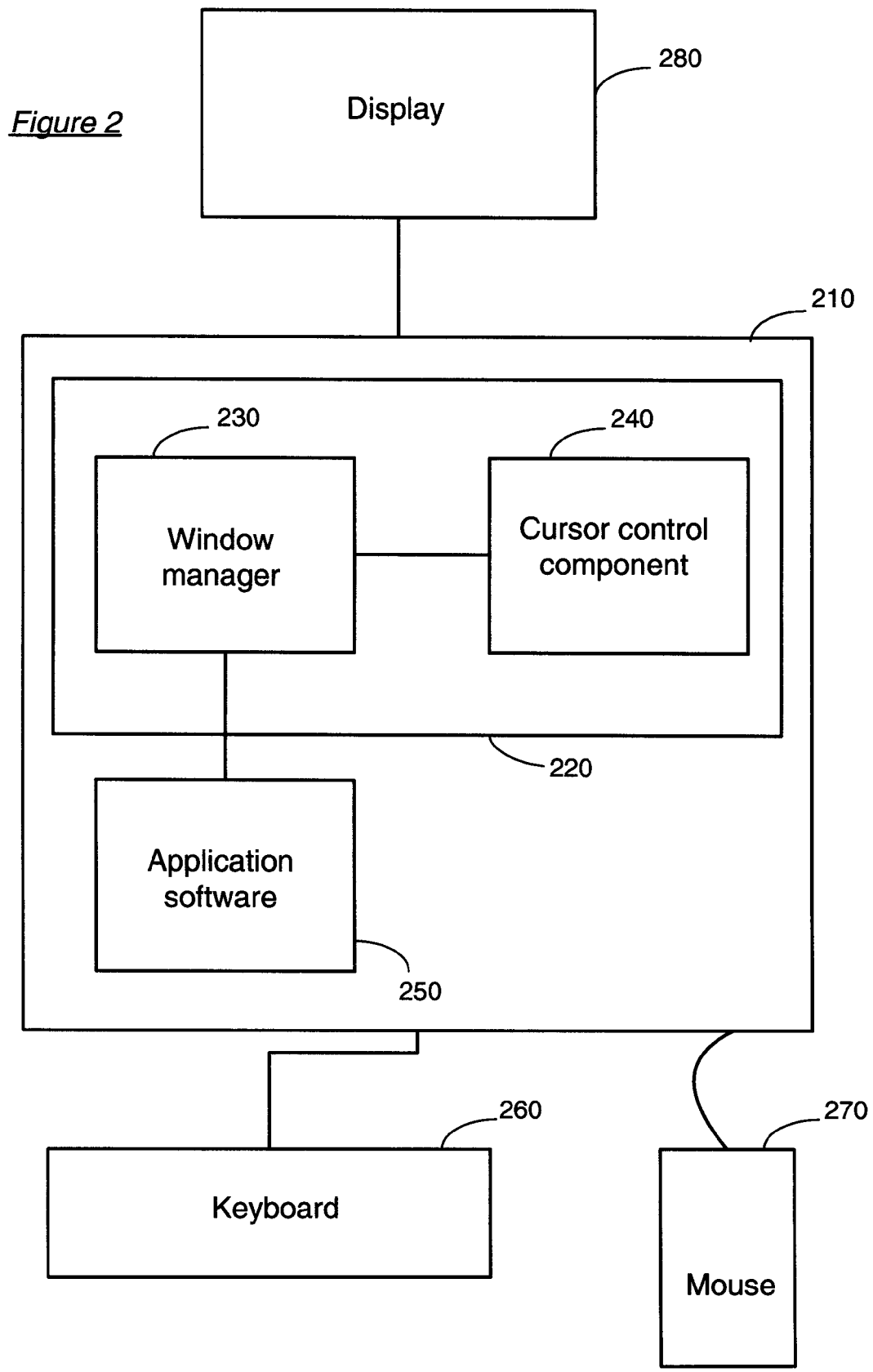
FIG. 2 is a schematic diagram of a system including a preferred embodiment of the present invention.

FIG. 2 is a diagrammatic representation of a preferred embodiment of the present invention. Computer system 210 comprises the operating software of a computer including a preferred embodiment of the present invention. Depicted is application software 250, for example a word processor. Also depicted is computer operating system 220. Operating system 220 comprises window manager 230 and cursor control component 240. When application software 250 is started by selection action of a user, the application software 250 sends a request to window manager 230 to start a window to provide the interface to the running instance of the application. In a preferred embodiment, window manager 230 is responsible for determining the appearance, size and screen position of the window. Alternatively, application software 250 may communicate desired appearance, size and position to window manager 230. In a preferred embodiment, appearance and size are set by default settings in the window manager 230 which may be configurable by the user. The position at which window manager 230 opens the window is also set by a series of defaults, usually providing a set of possible positions. Preferably, window manager 230 does not open successively started windows directly on top of each other. Preferably, window manager 230 opens each new window at a position different from the previously started window. This ensures that the number of opened windows is readily discernible by the user because at least a portion of each open window is visible on the desktop 110.

The user interacts with the graphical user interface desktop 110 on display 280 using a cursor movement device such as mouse 270, a trackball, a trackpad or a joystick. Movement of mouse 270 generates signals indicative of the movement which are communicated to cursor control component 240. Cursor control component 240 comprises program code which interprets signals from cursor movement device, for example mouse 270. Although cursor control component 240 is depicted as a separate software component of operating system 220, its function may be performed by window manager 230. When cursor movement device is mouse 270, according to a preferred embodiment, cursor control component 240 comprises mouse driver software. Cursor control component 240 moves graphical cursor 140 in response to movement of mouse 270. Cursor 140 comprises a single pixel point, usually at its tip, sometimes known as the hot spot, which is the site of action of commands communicated from mouse 270 to cursor 140. The position of the cursor 140 hot spot is tracked by cursor control component 240 which views desktop 110 on display 280 as a bitmap on which each pixel is represented by x- and y-coordinates, usually with reference to the top left corner of desktop 110. Cursor control component 240 also communicates the position of cursor 140 to window manager 230.

As illustrated in FIG. 1b, when the user starts an instance of application software 250, window manager 230 configures a window 150 and displays it on desktop 110. The situation may arise as illustrated in which the cursor 140 hot spot is within a GUI control element, for example a control button, of window 150 at its intended creation point as set by window manager 230, in this case CLOSE button 170c. A selection action by the user as the window is created, for example by depressing a button of mouse 270, will cause a "close window" command to be issued. Window manager 230 will then close window 150. This selection action may be an inadvertent action, or designed for another application window already open on desktop 110, and will be a source of irritation to the user.

Window manager 230 determines the bounding coordinates of window 150 to be opened on the bitmap of desktop 110. Window manager 230 is therefore aware also of the bounding coordinates of the visual components of window 150, namely title bar 160, and control elements: window menu selection button 180, MINIMIZE button 170a, MAXIMIZE button 170b and CLOSE button 170c. Window manager 230 includes logic to compare the bounding coordinates of window control elements with the current coordinates of the cursor 140 hot spot as communicated to it by cursor control component 240. FIG. 1b illustrates a situation in which this comparison will produce a positive result, with cursor 140 hot spot within the bounding coordinates of CLOSE button 170c.

Figure 3A:
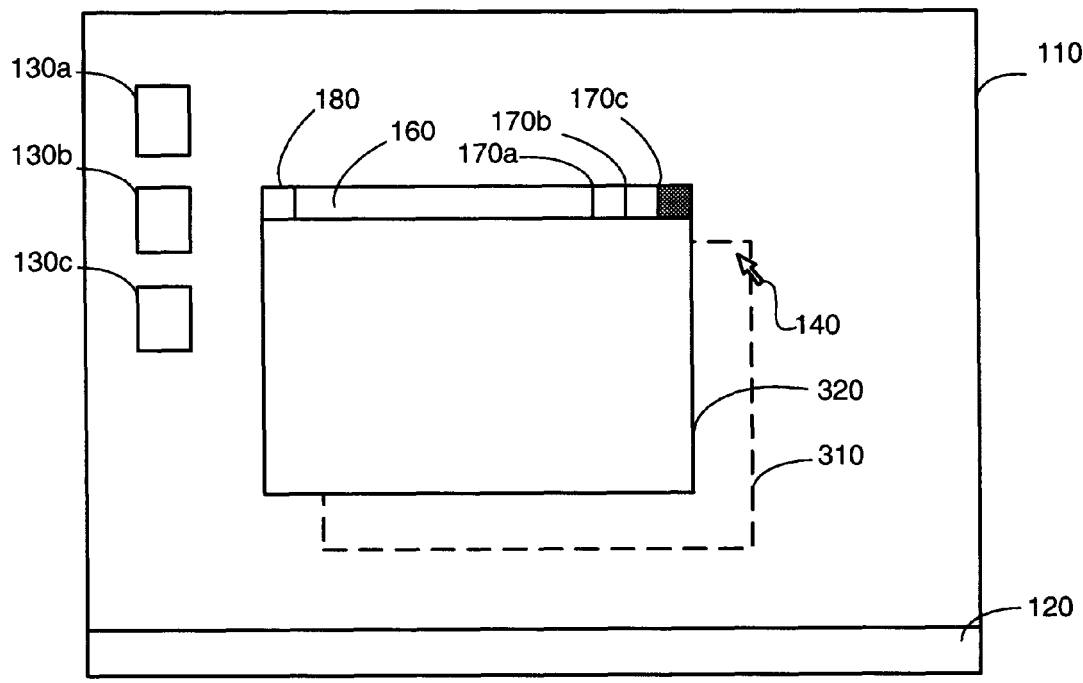
FIG. 3a is a representation of a desktop of a graphical user interface depicting the solution of a preferred embodiment of the present invention.

FIG. 3a illustrates a solution according to a preferred embodiment of the present invention. Illustrated is the intended creation point 310 of the window 150 shown in FIG. 1b. A comparison of the position of cursor 140 hot spot from cursor control component 240 with coordinates of the window control elements is conducted by logic of window manager 230. A positive result is produced because cursor 140 hot spot coincides with CLOSE button 170c. In response, window manager 230 revises the creation position of the window. In the illustrated embodiment, the window is created instead at position 320. At this position, there is no longer a positive result of the comparison of window control element coordinates with cursor 140 hot spot, and the window may open normally. In a preferred embodiment, window manager 230 uses the next position in its series of default window positions at which to open the window. It repeats the coordinate comparison. A negative result will cause window manager 230 to create the window at this new position 320. It will be apparent to the skilled person that any other means of shifting window position may be used.

Figure 3B:
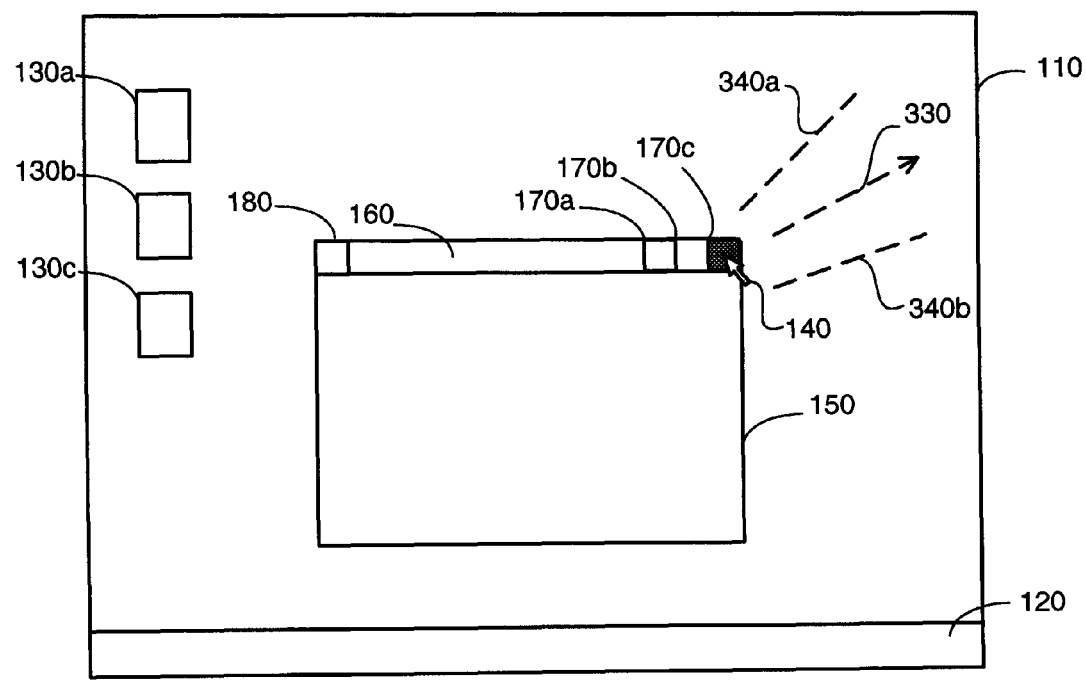
FIG. 3b is a representation of a desktop of a graphical user interface depicting a further preferred embodiment of the present invention.

FIG. 3b illustrates a further preferred embodiment of the present invention. In this embodiment, the situation is addressed in which cursor 140 is moving at the time of window creation. In this embodiment, cursor control component 240 records the current speed and direction of cursor movement. As illustrated in FIG. 3b, cursor 140 is moving in direction 330. Cursor control component 240 produces a range of possible cursor coordinates based on computation of cursor speed and direction of movement. In the illustrated embodiment of FIG. 3b, these possible coordinates lie within the approximate bounds shown by lines 340a and 340b. In this embodiment, rather than communicate a single cursor 140 hot spot coordinate address, cursor control component 240 communicates a range of possible coordinates to window manager 230. Window manager 230 uses this range of coordinates in its comparison with window control element bounding coordinates rather than a single value for cursor 140 hot spot. This avoids the possibility of inadvertently opening a window under a future possible cursor position.

In a further preferred embodiment, and illustrated again by FIG. 3b, window manager 230 disables operation of window control elements until cursor 140 has been moved away from their intended creation positions. Window manager 230 responds to a positive result of a comparison of cursor 140 hot spot position and coordinates of window control elements, such as CLOSE button 170c, by disabling the operation of window control elements, for example CLOSE button 170c. After a time interval, the comparison is carried out again. If cursor 140 has been moved, for example in the direction of the arrow 330, the comparison will now produce a negative result. Window manager 230 now re-enables window control element functions.

In a further preferred embodiment, window manager 230 responds to a positive result of the comparison of cursor 140 hot spot position and window control element coordinates by disabling control element functions for a time interval before re-enabling them, without waiting for cursor 140 to move. This allows time for the user to recognize window creation and avoid inadvertent window control element operation.

Figure 4:
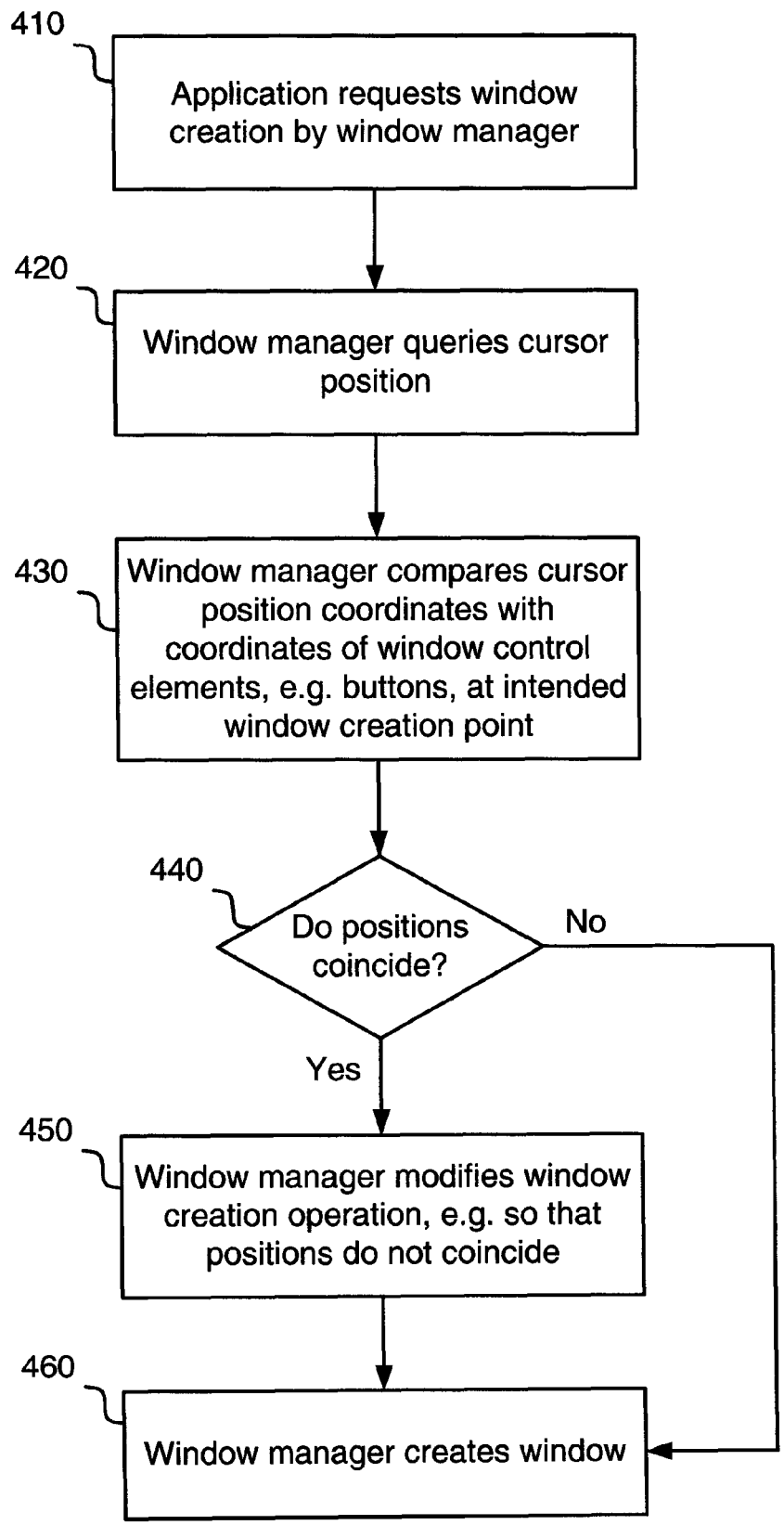
FIG. 4 is a flow diagram of the solution of a preferred embodiment of the present invention.

FIG. 4 is a flow chart illustrating the operation of a preferred embodiment of the present invention. At step 410, application software 250 requests window manager 230 create an instance of the application in a window 150. At step 420, window manager 230 queries cursor position from cursor control component 240. At step 430, cursor control component 240 passes cursor 140 hot spot coordinates to window manager 230, and window manager 230 compares the coordinates with those of window control elements, for example control buttons, at an intended window creation point at step 440. A positive result at step 440 causes window manager 230 to modify window creation operation at step 450, for example so that positions do not coincide. The window manager then creates the window at step 460. A negative result at step 440 causes window manager 230 to create a window at step 460 without modifying window creation operation.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

The invention claimed is:

1. A method for controlling a graphical user interface (GUI), comprising:
creating a window on the graphical user interface at an intended window creation location in a window creation operation;
identifying bounding coordinates of a GUI control element of the window at the intended window creation location;
identifying coordinates of a graphical cursor;
comparing the bounding coordinates of the GUI control element with the coordinates of the graphical cursor at a time of window creation;
identifying that the coordinates of the graphical cursor are within the bounding coordinates of the GUI control element of the window at the intended window creation location at the time of window creation; and
responsive to identifying that the coordinates of the graphical cursor are within the bounding coordinates of the GUI control element of the window at the intended window creation location at the time of window creation, modifying the window creation operation by changing the intended window creation location of the window to a different window creation location so that the coordinates of the graphical cursor are not within the bounding coordinates of the GUI control element of the window at the time of window creation.

2. The method of claim 1 wherein the GUI control element is one of a close button, a minimize button, a maximize button, a menu button, a check box and a radio button.

3. The method of claim 1 wherein the location of the graphical cursor is a current location.

4. The method of claim 1 wherein the location of the graphical cursor is a predicted location.

5. The method of claim 4 wherein the predicted location of the graphical cursor is determined from information concerning speed and direction of cursor movement at the time of window creation.

6. The method of claim 1 wherein the modifying of the window creation operation comprises:
disabling the operation of the GUI control element until the graphical cursor has moved away from an intended GUI control element creation location of the GUI control element.

7. The method of claim 6 further comprising:
repeating the comparison after a time interval; and
responsive to determining that the graphical cursor has moved away from the intended GUI control element creation location of the GUI control element, creating the window with GUI control element operation enabled.

* * * * *